US008140992B2

(12) United States Patent
Jean et al.

(10) Patent No.: US 8,140,992 B2
(45) Date of Patent: Mar. 20, 2012

(54) DEVICE FOR AIRCRAFT DIALOGUE

(75) Inventors: David Jean, Castanet Tolosan (FR);
Remi Cabaret de Alberti, Toulouse (FR); Sebastien Levret, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1057 days.

(21) Appl. No.: 11/832,529

(22) Filed: Aug. 1, 2007

(65) Prior Publication Data
US 2008/0195966 A1    Aug. 14, 2008

(30) Foreign Application Priority Data

Aug. 23, 2006   (FR) ..................................... 06 07465

(51) Int. Cl.
*G06F 3/048* (2006.01)
*G01C 23/00* (2006.01)
(52) U.S. Cl. ............. 715/778; 715/781; 715/810; 701/3
(58) Field of Classification Search .................... 715/781
See application file for complete search history.

(56) References Cited

U.S. PATENT DOCUMENTS

| | | | | |
|---|---|---|---|---|
| 5,900,877 A * | 5/1999 | Weiss et al. | ..................... | 715/803 |
| 6,181,987 B1 * | 1/2001 | Deker et al. | ...................... | 701/3 |
| 6,199,015 B1 * | 3/2001 | Curtwright et al. | ........... | 701/213 |
| 6,392,671 B1 * | 5/2002 | Glaser | ........................... | 715/765 |
| 6,512,529 B1 * | 1/2003 | Janssen et al. | ................ | 715/790 |
| 6,668,215 B2 * | 12/2003 | Lafon et al. | ........................ | 701/3 |
| 6,784,869 B1 * | 8/2004 | Clark et al. | ................... | 345/156 |
| 6,879,886 B2 * | 4/2005 | Wilkins et al. | .................... | 701/3 |
| 6,922,703 B1 * | 7/2005 | Snyder et al. | ................. | 345/633 |
| 2004/0151388 A1 * | 8/2004 | Maeda | .......................... | 382/232 |
| 2006/0005147 A1 * | 1/2006 | Hammack et al. | ............ | 715/805 |
| 2006/0041847 A1 * | 2/2006 | Maw | ............................. | 715/793 |
| 2006/0066638 A1 * | 3/2006 | Gyde et al. | .................... | 345/635 |
| 2006/0089978 A1 * | 4/2006 | Lee et al. | ...................... | 709/219 |
| 2006/0164261 A1 * | 7/2006 | Stiffler | ......................... | 340/945 |
| 2008/0016472 A1 * | 1/2008 | Rohlf et al. | ................... | 715/848 |

FOREIGN PATENT DOCUMENTS

| WO | 0225212 | 3/2002 |
|---|---|---|
| WO | 2006074081 | 7/2006 |

OTHER PUBLICATIONS

Shiozawa, H., Okada, K., and Matsushita, Y. 1999. Perspective layered visualization of collaborative workspaces. In Proceedings of the international ACM SIGGROUP Conference on Supporting Group Work (Phoenix, Arizona, United States, Nov. 14-17, 1999). Group '99. ACM Press, New York, NY, 71-80. DOI=http://doi.acm.org/10.1145/320297.320305.*
Preliminary Search Report date Apr. 12, 2007.
G. Francis, et al.; "Aircraft Multifunction Display and Control Systems: A New Quantitative Human Factors Design Method for Organizing Functions and Display Contents," XP002292742, Apr. 1997, pp. 1-43.
S. Mejda, et al.: "Human Factors Design Guidelines for Multifunction Display," XP002428928, Oct. 2001, pp. 1-71.

(Continued)

*Primary Examiner* — Chat Do
*Assistant Examiner* — Stephen Alvesteffer
(74) *Attorney, Agent, or Firm* — Dickinson Wright PLLC

(57) ABSTRACT

A dialogue device deactivation/activation unit for deactivating layers of an interactive window which are associated with systems of the aircraft that are not selected.

4 Claims, 2 Drawing Sheets

OTHER PUBLICATIONS

A. De Reus, et al.; "Three Large LCD Cockpit Concept for Retrofit Applications," XP0107464890, Oct. 2004, pp. 1-11.
R. Verhoeven, et al.; "Prototyping Interactive Cockpit Applications," XP0107464917, Oct. 24, 2004, pp. 1-10.

J.-D. Fekete, et al.; "Using the Multi-Layer Model for Building Interactive Graphical Applications," XP000728625, Nov. 6, 1996, pp. 109-118.

* cited by examiner

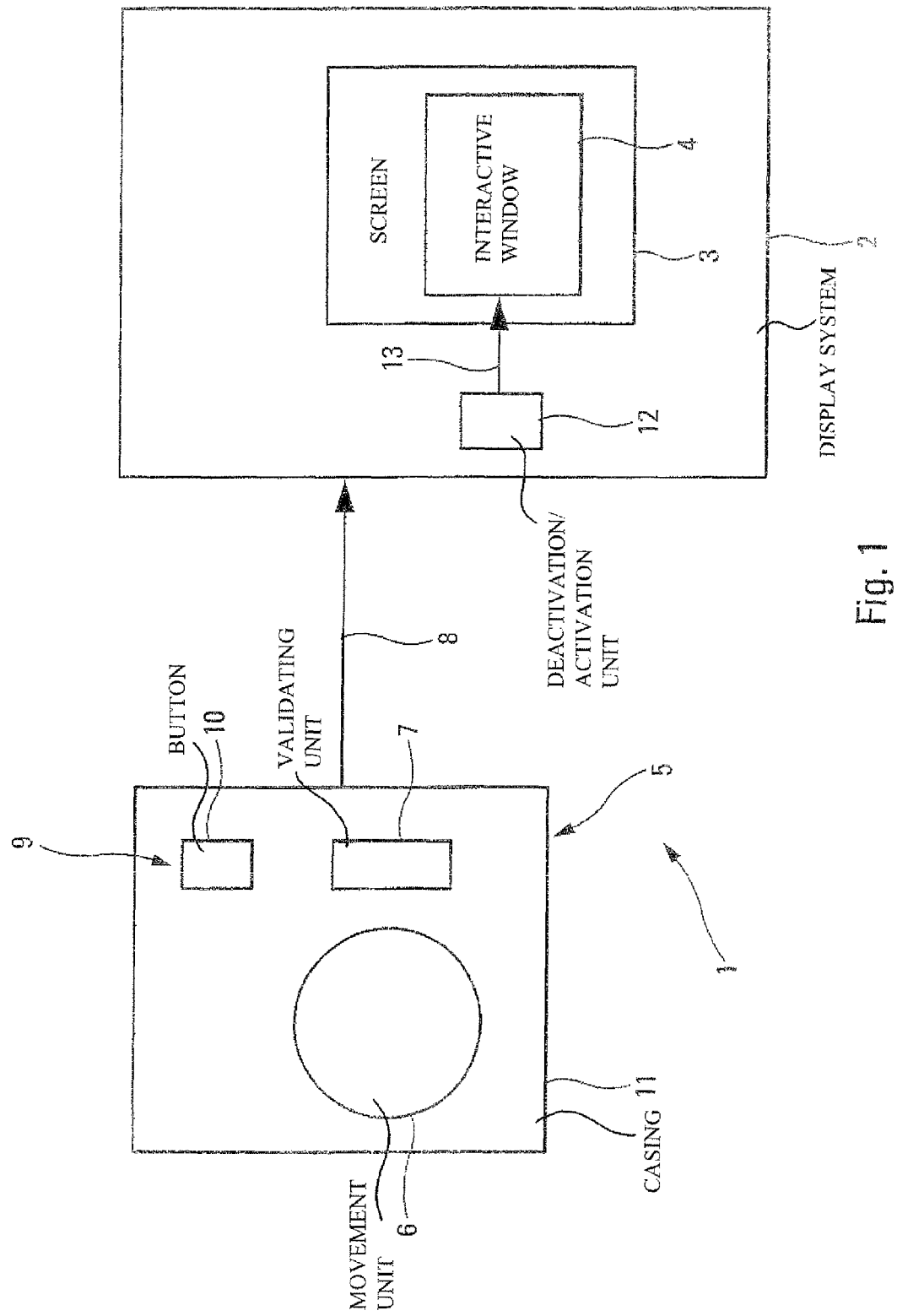

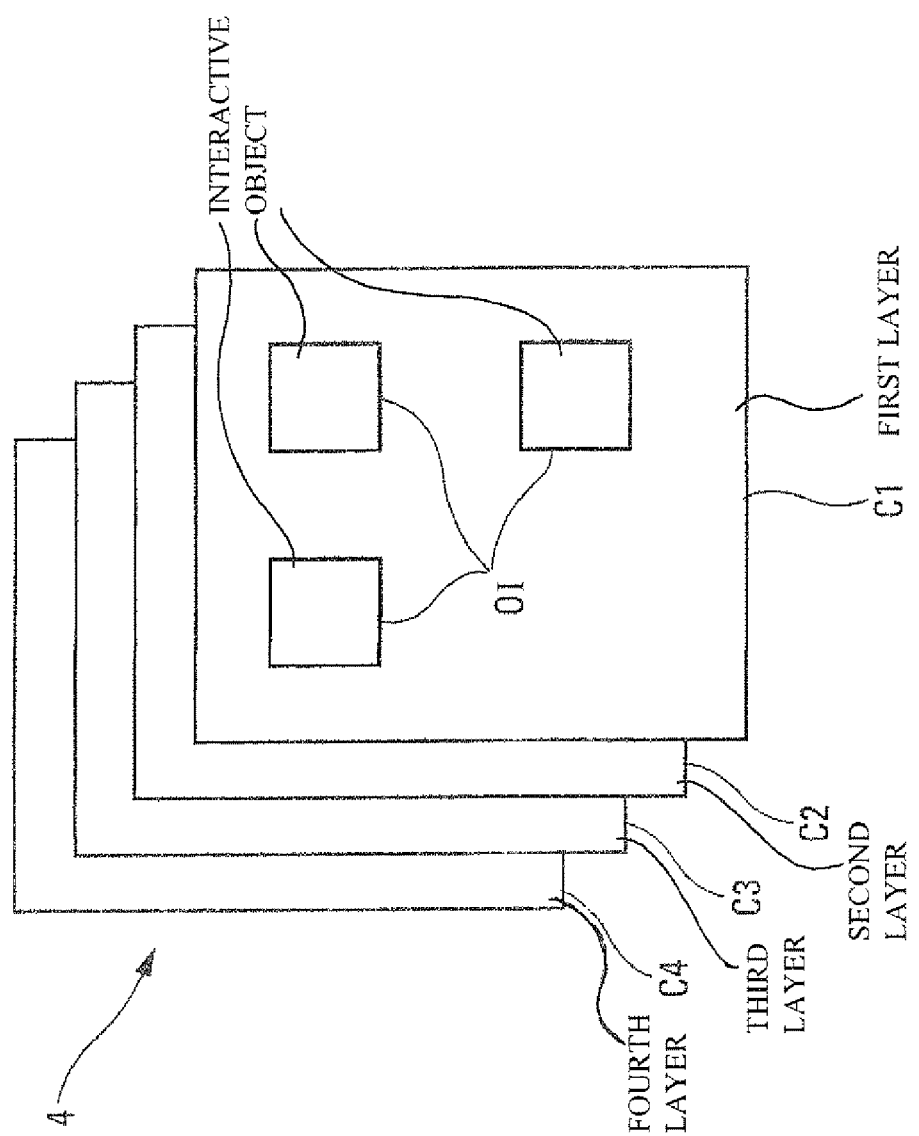

DEVICE FOR AIRCRAFT DIALOGUE

TECHNICAL FIELD OF THE INVENTION

The present invention relates to a device, for an aircraft, for dialogue between an operator of the aircraft, in particular a pilot of the aircraft, and systems of said aircraft, hereafter called "client systems".

BACKGROUND OF THE INVENTION

In the context of the recent invention, the term "client system" is understood to mean a system which is fitted in an aircraft and which comprises functions able to be triggered by said dialogue device, under the action of the operator, for the purpose of their execution. Moreover, the term "execution of a function, in understood to mean, in particular:
  implementation of a control of an element (engine, lighting, etc) of the aircraft or of a particular action;
  entry of data;
  access to information pages on screens; and/or
  access to information or complementary actions without changing the page.

Although not exclusively, a client system can correspond in particular to an FMS ("Flight Management System"), to a tactical management system or to a monitoring system.

Said dialogue device which is installed in the aircraft usually comprises:
  a display system comprising at least one screen which is able to display at least one interactive window. In the context of the present invention, this interactive window comprises a plurality of layers, each of which is associated with one of said client systems, each of said client systems being associated with a single layer of the interactive window. Moreover, each of said layers comprises at least one interactive object able to display a menu which is intended for the system associated with said layer; and
  at least one cursor control device which is able to be actuated manually by said operator and which comprises:
    at least one movement means which can be actuated, for example a rotary knob or a mouse, able to move a cursor over said interactive window in such a way as to indicate an interactive object; and
    at least one validating means which can be actuated, able to validate an interactive object which is indicated by the intermediary of said cursor in order to open the corresponding menu.

When an operator, in particular the pilot of the aircraft, wishes to interact with an interactive object, for example in order to move a waypoint of the aircraft's flight plan, he must place the cursor on that interactive object with the help of said movement means which can be actuated, and he must then validate the latter using said validation means which can be actuated. In response to this validation, the menu corresponding to that interactive object is opened, which generally makes it possible to offer the pilot a choice of actions to take. The pilot can then continue the interactivity by clicking on the line of the menu corresponding to the function he wishes to activate, for example the movement of a waypoint of the flight plan.

Such a display on a screen using a plurality of layers associated with different client systems makes it possible for several interactive objects to be displayed simultaneously at the same position on the screen, if they are positioned at latitudes and longitudes that are identical or very close to each other. In this case, if the operator brings the cursor to such a position on the screen where there are several interactive objects corresponding to different layers and if he validates this position of the cursor, the applications of the corresponding client systems will each at the same time open a menu corresponding to the interactive object thus validated. Such an opening of a plurality of different menus will result in a masking of a large portion of the screen, whereas the pilot simply wishes to interact with a single and particular interactive object. Such a multiple opening obviously complicates the pilot's comprehension and reading of the display and increases his workload.

SUMMARY OF THE INVENTION

The present invention relates to a dialogue device for an aircraft, which makes it possible to overcome the aforesaid disadvantages.

For this purpose, according to the invention, said dialogue device which is installed in the aircraft and which comprises:
  a display system comprising at least one screen which is able to display at least one interactive window which comprises a plurality of layers, each of which is associated with one of said client systems, each of said client systems being associated with a single layer of the interactive window, and each of said layers comprising at least one interactive object able to display a menu which is intended for the system associated with said layer; and
  at least one cursor control device which is able to be actuated manually by said operator and which comprises:
    at least one movement means which can be actuated, able to move a cursor over said interactive window in such a way as to indicate an interactive object; and
    at least one validating means which can be actuated, able to validate an interactive object which is indicated by the intermediary of said cursor in order to open the corresponding menu, is noteworthy in that:
  each one of said layers of the interactive window is formed in such a way as to exhibit interactivity able to be activated and deactivated in such a way that:
    when the interactivity of a layer is activated, each interactive object of that layer can be validated; and
    when the interactivity of a layer is deactivated, no interactive object of that layer can be validated; and
  said dialogue device furthermore comprises:
    selection means which are able to be actuated manually by said operator and which make it possible to select one of said client systems; and
    activation/deactivation means which are able to activate and to deactivate the various layers of said interactive window and which are formed in such a way as to activate, at the time of selection of a client system by the intermediary of said selection means, the layer associated with said selected client system and to deactivate the layers associated with the other client systems that are not selected.

Thus, due to the invention, the operator can, before the validation of an interactive object (commanding the opening of a menu) pre-select the applications (corresponding to a particular client system) with which he wishes to interact, which makes it possible for him to avoid transmitting events (validations) to all of the applications concerned and thus to generate multiple responses (namely multiple menu openings) of these applications.

The dialogue device according to the invention therefore makes it possible to avoid a multiple opening of menus, the consequence of which is, in particular: to simplify the visibility on the screen considered in the present invention (comprising an interactive window formed of several layers)
   to simplify the pilot's comprehension of the situation and thus to reduce his workload; and
   to simplify the management used by the applications associated with the client systems in question.

In the context of the present invention:
   a window is a delimited area of the screen which has its own controls and in which information is displayed;
   an interactive window is a window in which there are display zones (or interactive objects) on which an operator can act. In the context of the present invention an interactive window is considered to comprise a plurality of layers;
   a layer represents a part of the display which is associated with a particular client system. Such a layer can be considered similar to a superimposable transparent sheet, and the display produced is formed by the superimposition of a set of different layers;
   an interactive object (or "widget") is a part of a layer on which an operator can act by bringing a cursor to it in order to indicate it and to validate it; and
   an application of a client system is called an "Avionic Equipment User Application" or "UA" in a usual ARINC 661 standard described below. This application generally represents the client system with which the display system communicates. However, it can also represent a sub-set (a function) of the system when the system comprises several partitions. In the ARINC 661 standard, each application corresponds to an entity with which the display system communicates. A certain amount of information is associated with each application: an identifier, a certain number of layers, etc. Each application downloads into the display system a list indicating the set of interactive objects which are used by the application in its layers.

Consequently, a (display) layer contains the set of interactive graphical objects ("widgets") belonging to a user application "UA" (this can be an FMS computer, a tactical computer, etc) in an ARINC 661 standard. A layer is connected to a window (which sizes the graphic zone of the screen upon which the layer can be displayed). The set of objects of a layer are controlled via the A661 protocol by the application to which, the layer belongs.

In one particular embodiment, said selection means comprise a button that can be actuated which is arranged on a casing of said cursor control device, said casing also comprising said movement means and said validation means.

In the context of the present invention, the activating/deactivating means will therefore activate the interactivity solely on the layers of the application which have been previously selected by the operator by the intermediary of the selection means and deactivate the interactivity on all of the layers of other applications, according to the interactivity mode desired by the operator. Thus, only the application selected by the operator will be able to be validated, which makes it possible to limit the opening of menus to a single application on the screen.

Moreover, in order to allow the operator to identify clearly which interactive application (that is to say which client system) is currently selected:
   said screen is formed in such a way as to present said cursor, at the time of selection of a client system, in the form of a symbol which is representative of said selected client system. Consequently, the cursor is provided with as many symbols as there are different client systems such that a selected client system can be recognized simply be seeing the cursor; and/or
   said screen comprises an indication means provided on said screen and indicating, if necessary, the client system which has been selected (by the intermediary of said selection means).

BRIEF DESCRIPTION OF THE DRAWINGS

The figures of the appended drawing will give a good understanding of how the invention may be embodied. In these figures, identical references indicate similar elements.

FIG. 1 is the block diagram of a dialogue device according to the invention.

FIG. 2 is a diagrammatic illustration of a plurality of layers existing on an interactive window according to the invention.

DETAILED DESCRIPTION OF THE INVENTION

The dialogue device 1 according to the invention and shown diagrammatically in FIG. 1 is installed in an aircraft, in particular a military transport aircraft, not shown, and is preferably placed in the cockpit of said aircraft. This dialogue device 1 is intended to allow the dialogue between at least one operator of the aircraft, the pilot in particular, and a plurality of systems of said aircraft, called client systems, such as an FMS ("Flight Management System"), a tactical management system or a monitoring system for example.

In order to do this, said dialogue device 1 comprises:
   a display system 2 which comprises at least one screen 3 which is able to display at least one interactive window 4 as described below; and
   at least one cursor control device 5 which is connected by the intermediary of a usual link 8 (of the wired type or of the electromagnetic waves type) to said display system 2, which can be actuated manually by an operator and which comprises:
      at least one movement means 6 which can be actuated, for example a roller ball, which is able to move a cursor over the interactive window 4 of the screen 3 in such a way as to indicate an interactive object OI; and
      at least one validating means 7 which can be actuated, for example a push-button, which is able to validate an interactive object OI which has been indicated by the intermediary of said cursor.

Said display system 2 can of course comprise one or more screens 3, and each of these screens 3 can comprise one or more interactive layers 4.

In the context of the present invention, said interactive window 4 comprises a plurality of layers C1, C2, C3, C4, as shown in FIG. 2. Each of these layers C1 to C4 is associated with one of said client systems and each of said client systems is associated with a single layer of an interactive window 4. Moreover, each of these layers C1 to C4 comprises at least one interactive object OI which is able to command the opening of a menu when it is indicated and validated by means of said means 6 and 7. A menu which is part of a layer is of course intended for the client system which is associated with that layer.

Moreover, in the context of the present invention:
   a window 4 therefore represents a delimited area of the screen 3 which has its own controls and in which information is displayed;
   an interactive window 4 is a window in which there are display zones (or interactive objects OI) on which an operator can act (using the means 6 and 7). In the context of the present invention an interactive window 4 is considered to comprise a plurality of layers C1 to C4;

a layer C1, C2, C3, C4 represents a part of the display which is associated with a particular client system. Such a layer can be considered similar to a superimposable transparent sheet, and the display produced is formed by the superimposition of a set of different layers;

an interactive object OI ("widget") is a part of a layer on which an operator can act by bringing a cursor to it in order to indicate it and to validate it; and an application of a client system is called an "Avionic Equipment User Application" or "UA" in a usual ARINC 661 standard described below. This application generally represents the client system with which the display system communicates. However, it can also represent a sub-set (a function) of the system when the system comprises several partitions. In the ARINC 661 standard, each application corresponds to an entity with which the display system communicates. A certain amount of information is associated with each application: an identifier, a certain number of layers, etc. Each application downloads into the display system a list indicating the set of interactive objects which are used by the application in its layers.

Although not exclusively, an interactive window 4 considered in the present invention can correspond to a usual ARINC 661 standard. This ARINC 661 standard defines a communication format, which supports the exchanges between the dialogue device 1 according to the invention and the client systems (not shown). This ARINC 661 standard is described in particular in the following document. "Cockpit display system interfaces to user systems", "ARINC specification 661-2, published 30 Jun. 2005.

Consequently, when an operator, in particular the pilot of the aircraft, wishes to interact with an interactive object OI, for example in order to move a waypoint of the flight plan of the aircraft, he must bring the cursor onto that interactive object OI using said movement means 6 which can be actuated, and he must then validate the latter using said validation means which can be actuated 7. In response to this validation, the menu which corresponds to this interactive object OI is opened in such, a way as to generally present a list of actions or of functions that can then be carried out. The pilot can then continue the interactivity by selecting from this list of the menu the function (or action) that he wishes to activate, for example the movement of a waypoint of the flight plan.

In particular, in order to avoid opening multiple menus in such a situation, the invention makes provisions such that:

each of said layers C1 to C4 of the interactive window 4 is formed in such a way as to have an interactivity able to be activated and deactivated such that:

when the interactivity of a layer Ci (i being an integer from 1 to 4 in the example shown in FIG. 2) is activated, each interactive object OI of that layer Ci can be validated; and when the interactivity of a layer Ci is deactivated, no interactive object OI of that layer Ci can be validated; and said dialogue device 5 furthermore comprises: selection means 9 which are able to be actuated manually by said operator, and which make it possible to select one of said client systems; and activation/deactivation means 12 which are able to activate and to deactivate the various layers C1 to C4 of said interactive window 4 (for example via a link 13). These activation/deactivation means 12 are formed in such a way as to activate, at the time of selection of a client system by the intermediary of said selection means 9 (to which they are for example connected by the intermediary of the link 8), the layer which is associated with said selected client system, and to simultaneously deactivate the layers associated with the other non-selected client systems.

It will be noted that a local application of the display system also has a layer. Within this layer interactive object connectors are defined (defined by the ARINC 661 standard allowing two layers to be linked). These connectors are linked to the different interactive layers. This link is defined in the graphical configuration of the display system: definition at a given time of the different windows displayed and of the layers contained by each window, and in this way therefore of the layer to which each connector points. According to the ARINC 661 standard, each connector has a dual parameter (true/false) and a capability of managing the interactivity of its layers to which a connector points. This local application activates and deactivates the interactivity on the layers, via the connector, according to the use by the crew of the activation/deactivation means 12.

In a preferred embodiment, said selection means 9 comprise a button 10 which can be activated and which is arranged on the casing 11 of the cursor control device 5. This casing 11 also comprises said movement means 6 and said validation means 7.

Thus, due to the dialogue device 1 according to the invention, the operator can, before the validation of an interactive object OI (commanding the opening of a menu), pre-select the application (corresponding to a particular client system) with which he wishes to interact, which makes it possible to avoid transmitting events (validations) to all of the applications concerned and thus generating multiple responses (namely multiple menu openings) of these applications.

The dialogue device 1 according to the invention therefore makes it possible to avoid a multiple opening of menus, the consequence of which is, in particular:

to simplify the visibility on the screen 3;

to simplify the pilot's comprehension of the situation and thus to reduce his workload; and to simplify the management used by the applications associated with the client systems in question.

In a preferred embodiment, the selection controlled by said selection means 9 is carried out cyclically. Thus, each actuation of said button 10 that can be actuated results in the selection of another client system and this selection always taking place in the same order in a cyclic manner (for example S1, S2, S3, S1, S2, etc. in the case of three client systems S1, S2 and S3).

Furthermore, in order to allow the operator to identify clearly which interactive application (that is to say which client system) is currently selected:

said screen 3 is formed in such a way as to show said cursor, at the time of selection of a client system, in the form of a symbol which is representative of said client system. Consequently, the display system 2 provides the cursor with as many different symbols as there are different client systems such that, a selected client system can be recognized solely by seeing the cursor on the screen 3; and/or said screen 3 comprises an indication means which is provided in a special display zone (not shown and produced for example in the form of a banner) of said screen 4 and which indicates, if necessary, the client, system which has been selected (by the intermediary of said selection means 9).

The invention claimed is:

1. A dialogue device for dialogue between an operator of an aircraft and aircraft systems of said aircraft, said dialogue device comprising:
   a display system comprising at least one screen configured to display at least one interactive window which comprises a plurality of layers, each layer of the interactive window being associated with one of said aircraft systems, and each of said layers comprises at least one interactive object configured to display a menu, wherein the display system is configured to display each of the at least one interactive objects simultaneously at a same position of a corresponding one of the plurality of layers; and
   at least one cursor control device linked to said display system and configured to be actuated manually by said operator, wherein the at least one cursor control device comprises:
   at least one movement unit that is configured to move a cursor over said interactive window to indicate the at least one interactive object;
   a selection unit configured to be actuated manually by said operator to select one of the aircraft systems, wherein the screen presents the cursor, at the time of selection of one of the aircraft systems, in the form of a symbol that is representative of the selected aircraft system; and
   at least one validating unit that is configured to validate the at least one interactive object through said cursor to open the corresponding menu, wherein the corresponding menu is an interactive list of actions or functions,
   wherein
   each one of said layers of the interactive window exhibits interactivity and is configured to be activated and deactivated such that:
   when a layer is activated, each of the at least one interactive objects of the activated layer is configured to be validated; and
   when the interactivity of a layer is deactivated, each of the at least one interactive objects of the deactivated respective layer is configured so that each of the at least one interactive objects cannot be validated; and
   wherein said dialogue device further comprises:
   an activation/deactivation unit, linked to the selection unit, which is configured to activate and to deactivate the plurality of layers of said interactive window such that, at the time of selection of an aircraft system through actuation of said selection unit, the layer associated with said selected aircraft system is activated, and the layers associated with the aircraft systems that are not selected are deactivated.

2. The dialogue device as claimed in claim 1, wherein said selection unit comprises a button configured to be actuated which is arranged on a casing of said cursor control device, said casing also comprising said movement unit and said validation unit.

3. The dialogue device as claimed in claim 1, said screen comprises an indicating unit provided on the screen and indicating the aircraft system which has been selected by the intermediary of said selection unit.

4. An aircraft system, comprising the dialogue device of in claim 1.

* * * * *